April 25, 1967     M. J. McINTYRE     3,315,422
SINGLE CABLE TOWER RAISING SYSTEM
Filed June 15, 1964     3 Sheets-Sheet 3
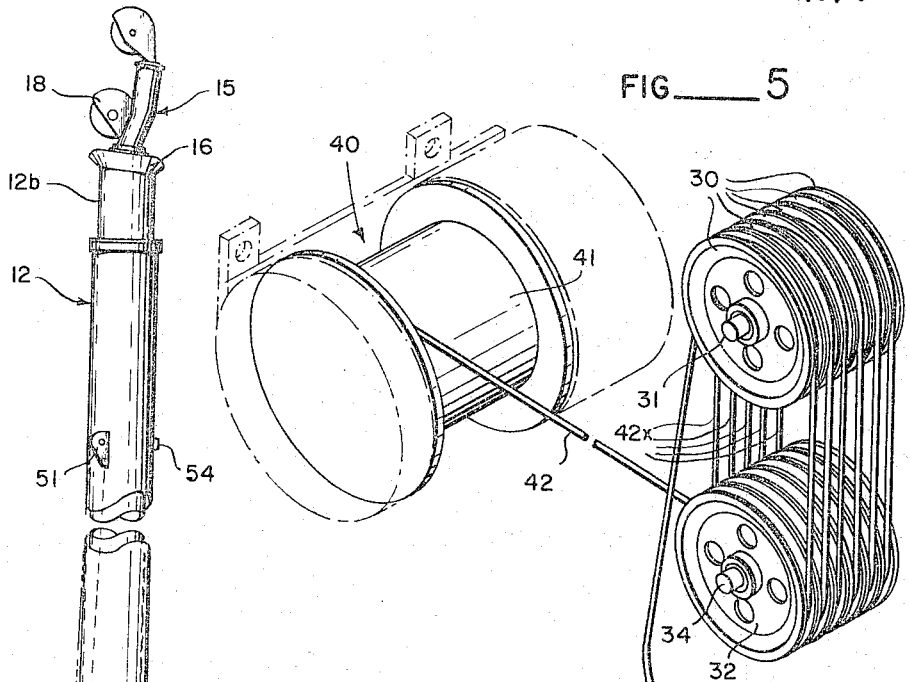
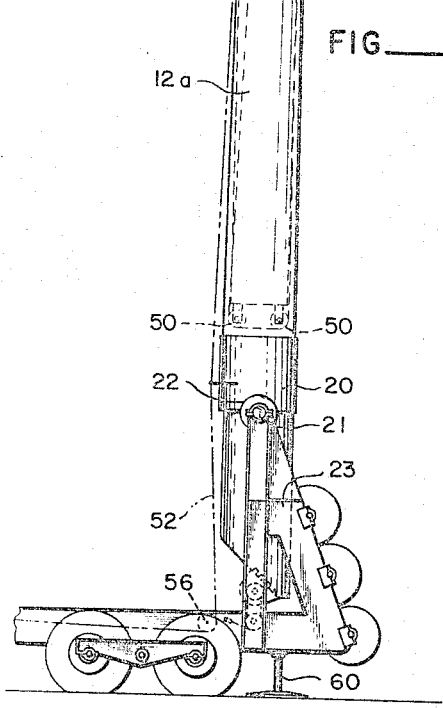
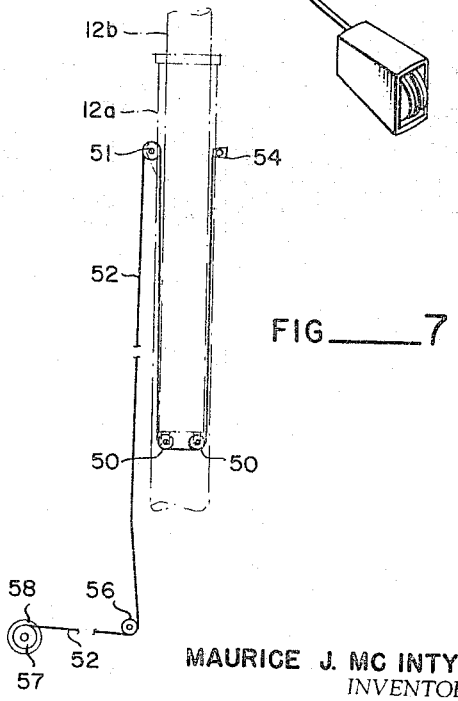
MAURICE J. MC INTYRE
INVENTOR.
BY *Seed & Berry*
ATTORNEYS

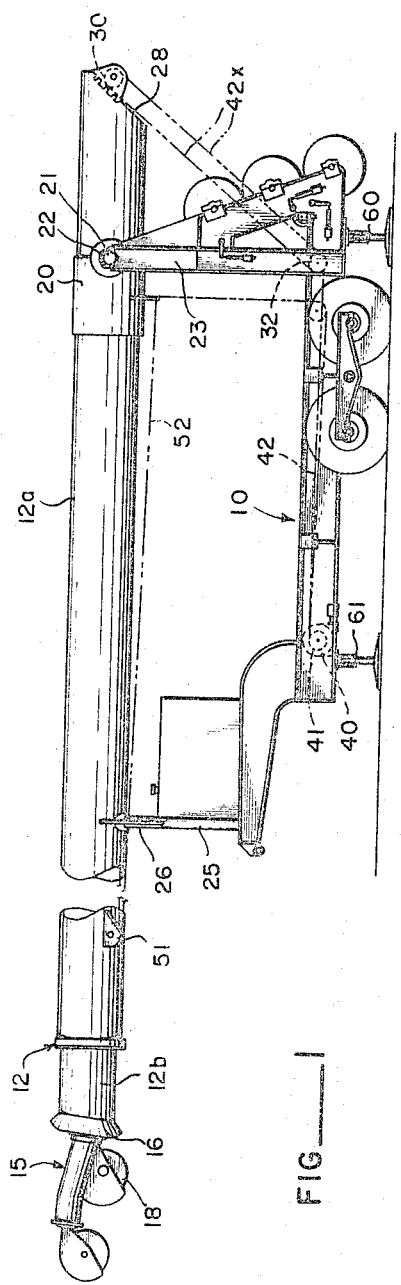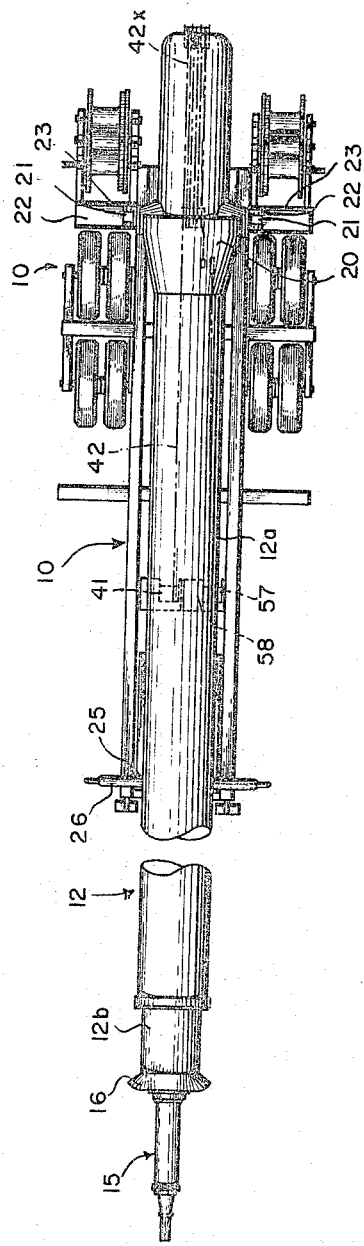

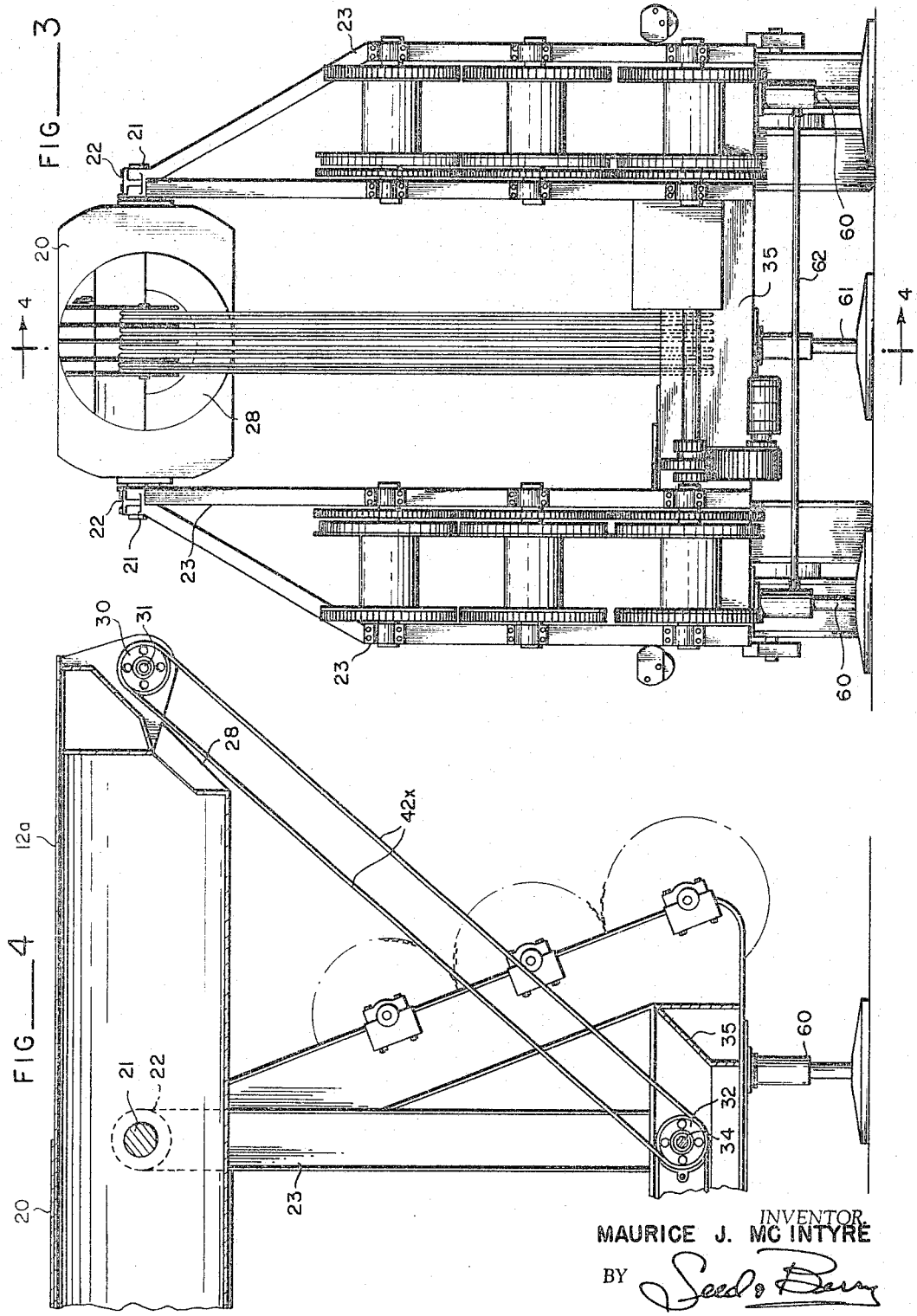

United States Patent Office 3,315,422
Patented Apr. 25, 1967

3,315,422
SINGLE CABLE TOWER RAISING SYSTEM
Maurice J. McIntyre, Sedro Woolley, Wash., assignor to The Humboldt Company, Seattle, Wash., a corporation of Washington
Filed June 15, 1964, Ser. No. 375,127
1 Claim. (Cl. 52—116)

This invention relates to portable logging towers or masts of those kind employed in cable logging operations as presently practised in the forested States of the Pacific Northwest.

More particularly, this invention relates to the use of novel means for the raising and lowering of a pre-rigged, telescopic mobile logging tower as mounted on a wheeled under-carriage which serves as a base for the tower when it is in an erected position and guyed for its intended uses, and serves as a conveyance for the tower when it has been lowered for transportation between different locations and place of use.

Specifically stated, the present invention relates to improvements in the specific cable means for the erecting and supporting of the erected tower on the carrier vehicle or under carriage and in the specific manner of the application and use of the present heel tackle equipment for effecting the tower erecting and lowering operations.

It is the primary object of the present invention to provide a mechanical tower raising system that is designed for efficiency, safety and for elimination of the usual condition of guylines being strung over the ground around the tower and its support while the tower is being erected or lowered.

It is a further object of this invention to provide a heel tackle cable system for raising the tower and for its controlled lowering involving a novel arrangement of grouped sheaves on the heel end of the tower and a complemental group on the tower support, about which groups of sheaves a single hoisting cable is reeved to provide a multiplicity of purchase increasing lines extending between the two groups that is especially advantageous in the tower raising operations.

Further objects and advantages of the invention reside in the various parts or elements involved in the heel cable system; in their relationship and in the manner of their use, as will hereinafter be disclosed.

In accomplishing the above mentioned and other objects of the invention, I have provided the improved details of construction, the preferred forms of which are illustrated in the accompanying drawings, wherein:

FIG. 1 is a side view of the portable logging tower of the present invention, in lowered position and as mounted on its wheeled under carriage or carrier vehicle.

FIG. 2 is a plan or top view of the tower and carrier as shown in FIG. 1.

FIG. 3 is an enlarged rear end elevational view of the parts shown in FIGS. 1 and 2.

FIG. 4 is a vertical section taken on line 4—4 in FIG. 3.

FIG. 5 is a view illustrating the reeving of the tower lifting cable about the two groups of sheaves as employed for the tower raising and lowering operations.

FIG. 6 is a schematic showing of a cable system for extending and lowering the telescopic upper section of the tower.

FIG. 7 is a view of the sheaves and cable as employed for lifting and lowering the upper end section of the mast.

Referring more in detail to the drawings:

10 designates, in its entirety, a trailer type of wheeled under carriage or vehicle of suitable strength and design for the mounting and conveyance thereon of the present tower and its associated powering equipment and cable winding devices; the telescopic tower being designated in its entirety by reference numeral 12.

As shown in FIGS. 1 and 2, the tower or mast comprises telescopically assembled lower and upper end sections 12a and 12b, each of tubular steel formation and of suitable diameters for their telescopic assembly. The diameter of the lower section of a tower presently being used, is approximately 36 inches, the upper section 30 inches and the height of the tower, when fully extended, is approximately 120 feet. The upper tower section 12b is equipped at its top or upper end with 360° fairlead assembly, designated by numeral 15 and below this with a collar 16 which may be in accordance with that of my copending United States application filed under Serial No. 297,273, filed July 24, 1963, now Patent Number 3,237,355, from which guyline blocks not shown may be suspended. A haul-back fairlead 18 as shown in FIG. 1 to be employed in the assembly 15.

The lower section 12a of the tower is fitted about eight to ten feet above its lower end with a heavy mounting and supporting collar 20. Mounted by this collar at opposite sides and in horizontal, transverse axial alignment, are pivot shafts or trunnions 21—21 which as well shown in FIG. 3, are contained, respectively, for the pivoted support of the tower, in bearings 22—22, fixed at the top ends of paired transversely aligned tower supporting and cable winding drum frames 23—23 that are fixedly erected on the base or bed frame of the tower supporting carrier vehicle 10. The distance of support of the bearings 22—22 above the vehicle bed frame is somewhat more than the length of the tower below the trunnions 21—21 in order that the lower end of tower will easily swing clear of the vehicle bed in tower erecting and lowering movements, as presently will be explained.

At its forward end, the carrier vehicle 10 is equipped with a cradle form of support 25 for the tower when in lowered to horizontal position. This support provides a seat between upwardly diverging arms 26—26 between which the tower will be received when swung to its horizontal for lowered position.

For a better understanding of the present tower, it will be observed that its lower end section 12a terminates in a beveled abutment surface 28 that slopes at about a 45° angle relative to the axial line of the tower; this being to give cable clearance when the tower is lowered as in FIG. 1.

One of the principal features of novelty residing in the present invention is the particular arrangement and use of the tower lifting and lowering cable and the two groups of sheaves about which the cable is reeved for increasing the power or purchase for swinging the tower between lowered and erected positions, as will now be described; reference being directed particularly to FIGS. 1, 4 and 5.

It has been shown in FIGS. 4 and 5 that the lower and larger end section 12a of the tower presently mounts a succession of six sheave wheels 30 of the same diameter, on a column axial shaft 31 that extends horizontally within and diametrically across the tubular tower and is fixed therein. Likewise, a companion or complemental series of sheave wheels 32 of like diameter are mounted to revolve on a horizontal shaft 34 that is securely mounted in a housing 35 that is fixed in or formed as a part of the bed frame structure of the tower mounting vehicle 10; this latter shaft 34 being located in the same vertical plane as the tower supporting pivot shafts 21—21 as shown in FIG. 4.

Mounted in the forward end portion of the bed frame of the tower mounting vehicle is a powered cable winding winch 40 equipped with a cable winding drum 41 on which one end of the tower raising and lowering cable 42 is dead ended. This cable extends rearwardly from the winch drum 41 and is passed in succession and in progressive order about the sheaves 32 and 30 of the two sheave groups, as has been illustrated in FIG. 5 and at its end is dead ended in the lower end portion of the tower section 12a.

When the tower is in a lowered position, as has been indicated in FIGS. 1 and 2, there will be 12 different cable leads between the two groups of sheaves. It will be understood that, with the inwinding of the cable 42 on the winch drum 41, the two groups of sheaves will be drawn toward each other at a speed substantially reduced below that of the travel of the cable as inwound onto the winch drum 41 but with substantially increased power, sufficient and suitable for swinging the tower on its mounting trunnions 21—21 from its lowered position to an erected position. When the tower is fully erected, the axial lines of the two groups of sheaves will be disposed and held in the same vertical axial plane as that of the tower supporting trunnions 21—21, by the tension of the 12 cable connections 42x between the sheave groups.

The telescopic tubular upper end section 12b of the tower has guided telescopic travel in the lower section 12a to prevent any relative rotation of the sections but without detriment to its being extended or retracted.

The upper section 12b of the tower is equipped at its lower end with a pair of sheaves 50—50 mounted in horizontal diametric alignment, but cleared from the walls of the lower tower section 12a, as shown in FIGS. 6 and 7. Also, mounted on the upper end portion of the outer tower section is a cable sheave 51. A lifting cable 52 for extending the upper tower section from the lower section is dead ended in the upper end of section 12a, as at 54 and extended downwardly and across the sheaves 50—50 thence, upwardly over the sheave 51 on the upper end portion of section 12a, thence downwardly and about a sheave 56 mounted in the frame of the carrying vehicle, thence forwardly and wound on a cable winding drum 57 of a power winch 58 mounted in the vehicle frame at a location adjacent winch 40.

With the inwinding of this cable 52 on drum 57 the upper tower section 12b may be lifted from a lowered position in the lower section 12a to a fully extended position and held for use. Likewise, it may be lowered by paying out the cable 52 from drum 57.

Latching means, not a part of this application is presently used to support the upper end section when fully extended.

It has also been shown that the carrier frame 10 is equipped at opposite sides of its rear end with leveling jacks 60—60 and at its front end, centrally with a leveling jack 61. The two jacks at the rear end are hydraulically equalized through a pipe connection 62 that allows free flow of the hydraulic medium from one to the other.

The present tower is held in vertical position on the jack leveled tower by tension maintained in the cable runs 42x. After the tower has been fully extended and locked, with guy lines attached, but before they are tightened, the heel tackle lines are slackened to allow the erected tower to pivot on its supporting trunnions 21—21. This allows free motion and unrestricted movement on the axis of the tower.

What I claim is:

In a logging tower unit having a tower, a base, and means mounting said tower on said base for pivotal movement about a generally horizontal pivotal axis between a substantially vertical upright position of use and a substantially horizontal position of non-use, a tower raising and lowering system comprising; a first succession of coaxial sheave wheels mounted on said base, the pivotal axis of said tower and the axis of said first succession of sheave wheels being parallel and disposed in the same vertical plane, a second succession of coaxial sheave wheels mounted on the lower end of the tower, the axis of said second succession of sheave wheels and the pivotal axis of the tower being located in a plane parallel to the central longitudinal axis of the tower, a cable looped in succession about said sheave wheels, one end of said cable being dead ended on either said tower or said base and cable winding means connected to the other end of said cable, the distance between said pivotal axis and said axis of said second succession of sheave wheels being less than the distance between said pivotal axis and said axis of said first succession of sheave wheels, whereby winding in of said cable will move said tower to the vertical upright position and align the axes of said sheave wheels and the pivotal axis of the tower in the same vertical plane, and inherently maintain all of said axes in said vertical plane as long as the cable is tight.

References Cited by the Examiner

UNITED STATES PATENTS 2,327,461    8/1943    Rower _____ 52—116 X
3,032,147    5/1962    Wilkinson et al. _____ 52—118

HARRISON R. MOSELEY, *Primary Examiner.*

J. K. BELL, *Assistant Examiner.*